H. J. MANN.
GEARING FOR TRACTION ENGINES.
APPLICATION FILED JUNE 8, 1907.

907,260.

Patented Dec. 22, 1908.

3 SHEETS—SHEET 2.

Witnesses
W. S. Rockwell
John S. Powers

Inventor
Harvey J. Mann
By Chandler & Chandler
Attorneys

H. J. MANN.
GEARING FOR TRACTION ENGINES.
APPLICATION FILED JUNE 8, 1907.
907,260.
Patented Dec. 22, 1908.
3 SHEETS—SHEET 3.
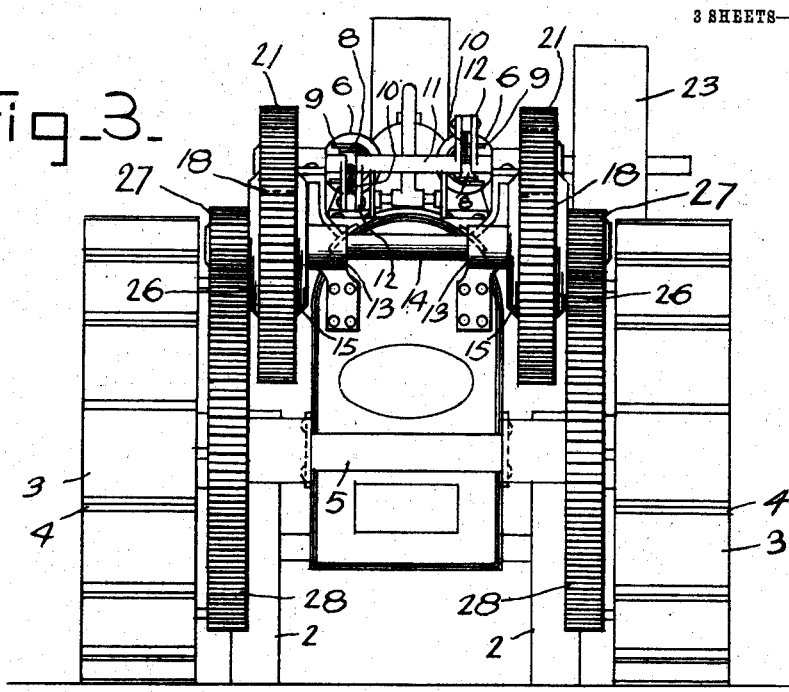
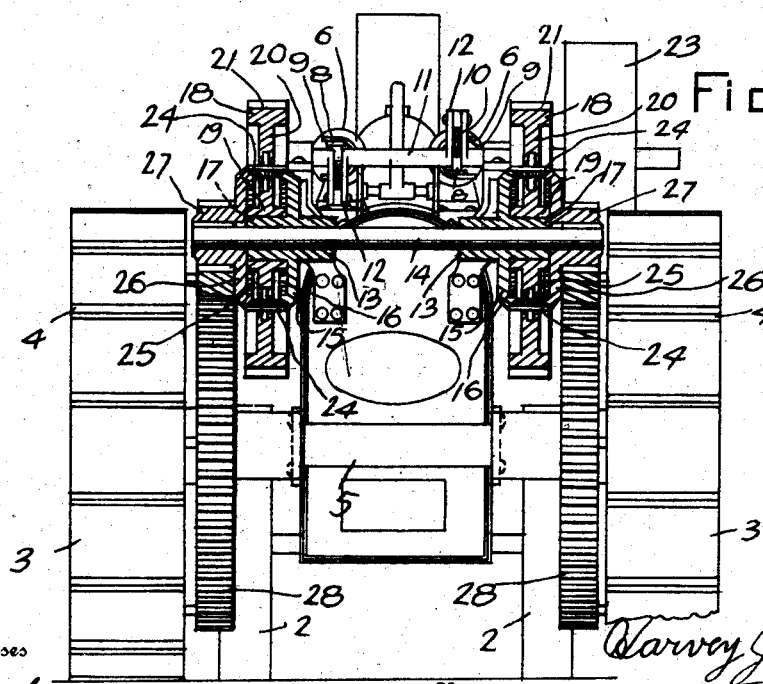

UNITED STATES PATENT OFFICE.

HARVEY J. MANN, OF ST. JOSEPH, MISSOURI.

GEARING FOR TRACTION-ENGINES.

No. 907,260.     Specification of Letters Patent.     Patented Dec. 22, 1908.

Application filed June 8, 1907. Serial No. 377,940.

*To all whom it may concern:*

Be it known that I, HARVEY J. MANN, a citizen of the United States, residing at St. Joseph, in the county of Buchanan, State of Missouri, have invented certain new and useful Improvements in Gearing for Traction-Engines; and I do hereby declare the following to be a full, clear, and exact description of the invention, such as will enable others skilled in the art to which it appertains to make and use the same.

This invention relates to new and useful improvements in traction engines, and it has more particular reference to the gearing thereof, the primary object being to provide a gearing in which the parts are so arranged that all tendency towards side draft is reduced to a minimum.

Figure 1:
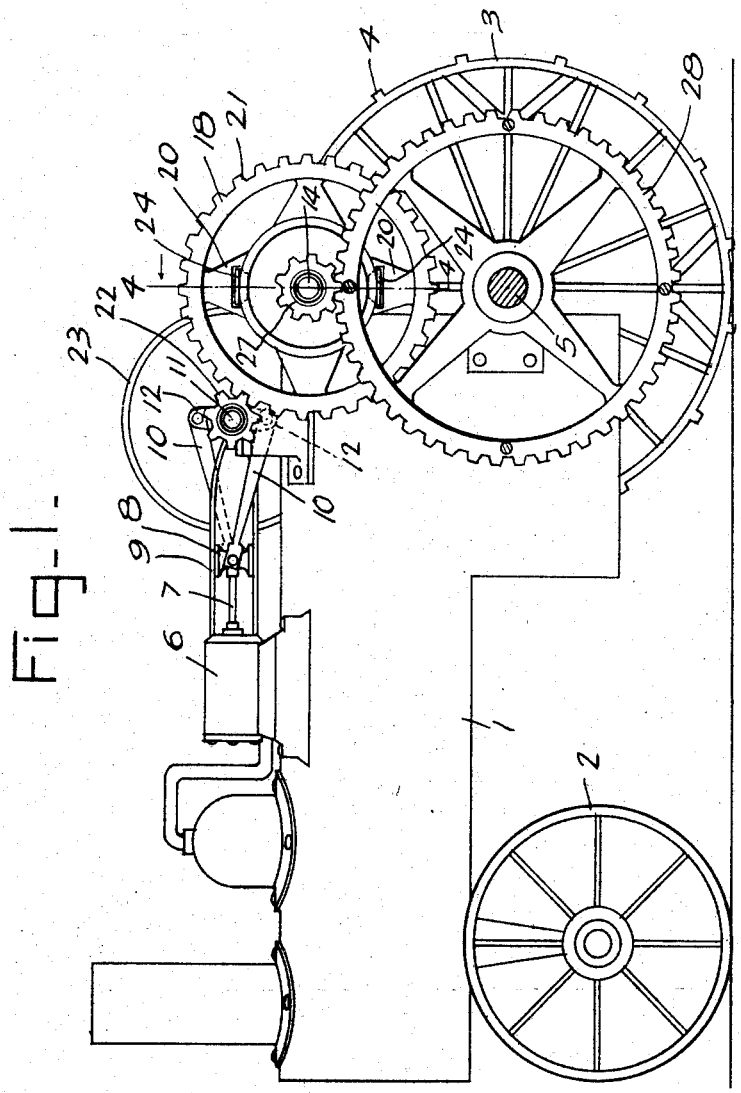
Figure 2:
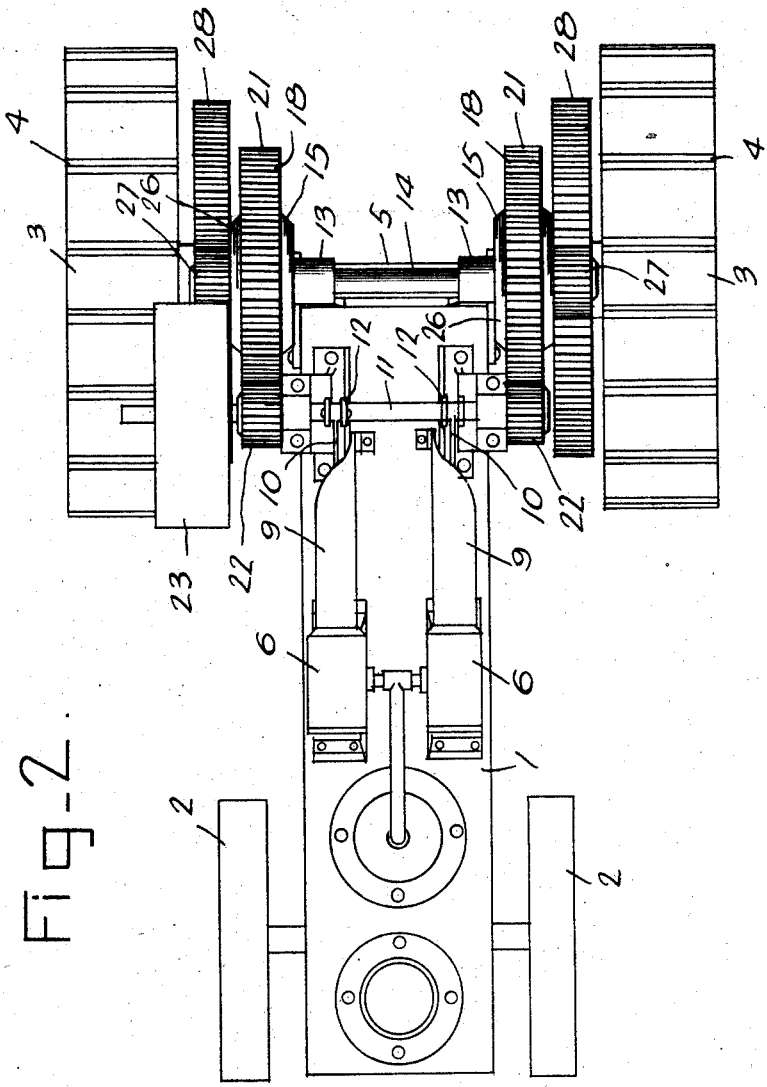

The invention resides in the novel construction, combination, and arrangement of parts, the details of which will appear in the course of the following description, in which reference is had to the accompanying drawings forming a part of this specification, like characters of reference designating similar parts, throughout the several views, wherein:

Figure 1 is a side elevation of a traction engine equipped with the gearing comprehended in the present invention. Fig. 2 is a top plan view thereof. Fig. 3 is a rear end elevation thereof. Fig. 4 is a transverse section on the line 4—4 of Fig. 1.

Referring specifically to the accompanying drawings, the numeral 1 designates the steam boiler and fire box, mounted on the front wheels 2 and the rear wheels 3, the latter being formed with the usual teeth 4 to take into the surface of the ground and being mounted on a transverse shaft 5.

The numeral 6 designates the driving engines, 7 their piston rods, 8 the cross heads, 9 the guides, 10 the pitmen, 11 the power shaft, and 12 the crank arms, with which the pitmen 10 have connection. Rearwardly of the body 1, are bearings 13, in which a countershaft 14 is journaled. Secured to the bearings 13 are disks 15, formed on their inner faces with crown teeth 16, and projecting beyond their inner faces, with centrally located hubs 17 upon which are mounted for rotation wheels 18, the latter comprising hubs 19, spokes 20, and toothed rims 21. The shaft 11 carries at each side of its bearings pinions 22, which mesh with the toothed rims 21 to drive the same, and adjacent one of said pinions is a belt or fly-wheel 23.

Mounted on the spokes 20 of the wheels 18 are bevel pinions 24, which are in mesh with the teeth 16 and likewise with similar teeth 25, provided on disks 26, the latter being carried by pinions 27 keyed upon the shaft 14. Mounted upon the shaft 5 are enlarged pinions 28, which are in mesh with and are driven from the pinions 27.

In operation, power is transmitted to the wheels 3, by reason of the engagement of the pinions 22, with the toothed rims 21, such engagement serving to drive the wheels 18. The wheels 18 in turn, by means of the bevel pinions 24, and the teeth 16 and 25, drive the pinions 27, and the latter drive the pinions 28, which are fast upon the shaft 5.

The gearing embodied in the present invention is inexpensive to manufacture and install, is simple in construction, and is practical and efficient in use, since it permits of all the transmission elements balancing one another at each side of the engine so as to reduce to a minimum all tendency towards side draft.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claim.

What is claimed is:

In a traction engine, a power driven shaft, having pinions, a countershaft, bearings for the latter, a disk fixed to the bearings and having teeth on their inner faces, rotatable gear wheels loosely mounted upon said bearings and enmesh with said pinions, pinions keyed to the countershaft and having toothed disks, beveled pinions carried by the rotatable gear wheels, and enmesh with the tooth disks, a rear axle, driving gears fixed to said axle, and to the driving wheels, and enmesh with the keyed pinions on the countershaft.

In testimony whereof, I affix my signature, in presence of two witnesses.

HARVEY J. MANN.

Witnesses:
 W. M. BELLER,
 HORACE STRINGFELLOW.